(12) United States Patent
Volnhals (10) Patent No.: US 8,542,775 B2
(45) Date of Patent: Sep. 24, 2013

(54) SERIAL DATA INTERFACE FOR SOFTWARE-DEFINED RADIO SYSTEM

(75) Inventor: Stefan Volnhals, Adelschlag (DE)

(73) Assignee: CSR Technology Inc., San Jose, CA (US)

( * ) Notice: Subject to any disclaimer, the term of this patent is extended or adjusted under 35 U.S.C. 154(b) by 282 days.

(21) Appl. No.: 12/945,584

(22) Filed: Nov. 12, 2010

(65) Prior Publication Data

US 2012/0121041 A1    May 17, 2012

(51) Int. Cl.
*H04B 1/06*    (2006.01)

(52) U.S. Cl.
USPC ............................. 375/316; 375/219; 375/295

(58) Field of Classification Search
USPC .................................. 375/316, 219, 257, 295
See application file for complete search history.

(56) References Cited

U.S. PATENT DOCUMENTS

| | | | | |
|---|---|---|---|---|
| 4,805,194 | A * | 2/1989 | Wesolowski | 375/316 |
| 6,611,556 | B1 * | 8/2003 | Koerner et al. | 375/224 |
| 8,315,293 | B2 * | 11/2012 | Wenzel et al. | 375/219 |
| 2003/0215020 | A1 * | 11/2003 | Dong et al. | 375/258 |
| 2004/0013177 | A1 | 1/2004 | Sorrells et al. | |
| 2006/0141973 | A1 | 6/2006 | Behrens et al. | |
| 2007/0071078 | A1 * | 3/2007 | Yoshida et al. | 375/219 |
| 2008/0014894 | A1 * | 1/2008 | Manku et al. | 455/318 |
| 2008/0165691 | A1 * | 7/2008 | Jorgenson et al. | 370/235 |
| 2009/0058706 | A1 | 3/2009 | Volnhals | |
| 2010/0226366 | A1 * | 9/2010 | Lee et al. | 370/389 |

OTHER PUBLICATIONS

Search Report issued for GB1119274.7, dated Feb. 29, 2012, 3 pages.
"Microtune Introduces Breakthrough RF Microdigitizer™ IC for Automotive Software Defined Radio"; Microtune®, Inc. (NASDAQ:TUNE); Dec. 9, 2009, pp. 1-5.

* cited by examiner

*Primary Examiner* — Kabir A Timory
*Assistant Examiner* — David Huang
(74) *Attorney, Agent, or Firm* — Fulbright & Jaworski LLP (57) ABSTRACT

A radio system comprises a front-end receiver for receiving a RF signal and converting the RF signal into a digital payload signal. The system further comprises a base-band processor for processing the digital payload signal, and a serial data interface over which the front-end communicates the digital payload signal and meta data to the base-band processor. The meta data may comprise information indicating whether a corresponding digital payload signal communicated over the serial data interface is valid and additional information of the front-end status, e.g. gain or state of tuning.

22 Claims, 6 Drawing Sheets

FRAME 0

| 31:16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ADC SAMPLE [15:0] | PLL LOCK N | ADC Good N | PIN chg | LNA chg | VGA chg | 0 | 0 | AGC ACTION [4:0] | | | | TUNING STATE [3:0] | | | |

*FIG. 4B*

FRAME 1

| 31:16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ADC SAMPLE [15:0] | PLL LOCK N+1 | ADC Good N+1 | PIN chg | LNA chg | VGA chg | 0 | 1 | AGC PIN DIODE GAIN [8:0] AM OR FM | | | | | | | | |

*FIG. 4C*

FRAME 2

| 31:16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ADC SAMPLE [15:0] | PLL LOCK N+2 | ADC Good N+2 | PIN chg | LNA chg | VGA chg | 1 | 0 | X | AGC LNA GAIN [7:0] AM OR FM | | | | | | | |

*FIG. 4D*

FRAME 3

| 31:16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ADC SAMPLE [15:0] | PLL LOCK N+3 | ADC Good N+3 | PIN chg | LNA chg | VGA chg | 1 | 1 | X | X | Temp Delta [1:0] | | AGC VGA GAIN [4:0] AM OR FM | | | | |

SERIAL DATA INTERFACE FOR SOFTWARE-DEFINED RADIO SYSTEM

TECHNICAL FIELD

The following description relates generally to signal processing, and more particularly to a serial data interface between a front-end receiver and a base-band processor in a digital radio system, such as in a software-defined radio (SDR) system.

BACKGROUND OF THE INVENTION

Conventional radio architectures employ a radio frequency (RF) front-end receiver and a base-band processor. In general, the front-end receiver receives a RF signal. For instance, the front-end receiver may include an antenna for receiving RF signals. The front-end receiver may further include one or more tuners for tuning to a particular channel (or frequency). The front-end receiver outputs the received signals (e.g., for the channel to which it is tuned), and the base-band processor receives those output signals from the front-end receiver and processes the signals to, for example, perform certain conversions and/or other processing to control the output of information contained in the signals to a human interface, such as processing the signals to produce audio signals for output to audio speakers. In this way, as one example, content (e.g., music and/or other audio content) may be broadcast via AM and/or FM, and a radio may employ a front-end receiver (with an AM and/or FM tuner) for receiving RF signals for a channel to which it is tuned and a base-band processor for processing the received signals to produce audio output of the corresponding content carried on the received RF signals.

A real-time loop is generally implemented between the front-end receiver and base-band processor through which certain handshaking signals are communicated so that the base-band processor knows exactly what the front-end receiver is doing at any time and vice versa. Such communication over the real-time loop has traditionally been critical because, for example, there are certain times when the front-end receiver is not outputting a proper signal. For instance, during the time when the front-end receiver is tuning from one channel to another, the front-end receiver is not outputting a clean payload signal for the desired channel to which it is being tuned (but may instead be outputting noise). The base-band processor is informed of such a condition so that it can properly control its output (e.g., to potentially avoid or minimize the output of static to the speakers).

Figure 1:
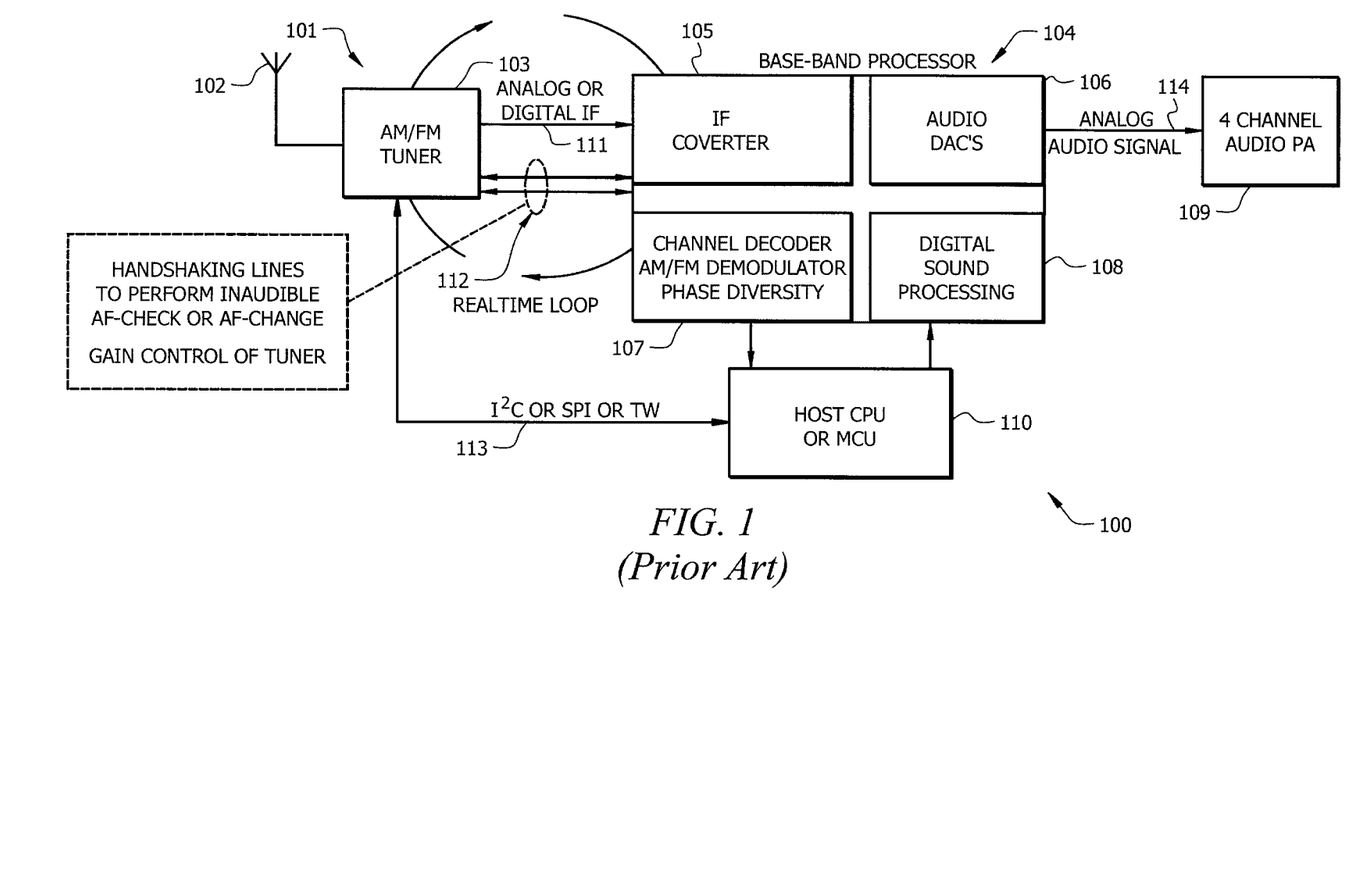
FIG. 1 is a block diagram of a conventional radio architecture that employs separate interfaces for communicating payload and for implementing a real-time loop for communicating status information between the front-end and base-band processor.

One example of a conventional radio architecture (e.g., conventional car radio architecture) is shown in FIG. 1. Architecture 100 of FIG. 1 includes a front-end receiver 101 that has an antenna 102 and an AM/FM tuner 103. Architecture 100 further includes a base-band processor 104 that has an intermediate frequency (IF) converter 105, audio digital-to-analog converter (DAC) 104, channel decoder with AM/FM demodulator and phase diversity functions 107, and digital sound processor 108. In this example, architecture 100 further includes a host central processing unit (CPU) 110, which may be a microprocessor, and audio power amplifier(s) (e.g., 4 channel audio PA) 109. Thus, this conventional architecture 100 includes a dedicated processor (104) that performs processing (e.g., AM/FM demodulation) of the payload signal 111 received from front-end receiver 101, and further includes a host CPU 110 that controls processor 104 and/or tuner 103 based on non-payload information (e.g., status information) exchanged in the realtime loop (e.g., via interfaces 112 and 113).

In operation, an RF signal is received by front-end receiver 101, via antenna 102. Tuner 103 outputs an analog or digital IF signal 111 to base-band processor 104. Base-band processor 104 processes the IF signal 111 (e.g., under control of host CPU 110), and the audio DACs 106 output a corresponding analog audio signal 114 to the audio PA 109.

In system 100, the front-end receiver 101 and base-band processor 104 are implemented on separate chips (on separate silicon substrates), and are thus separate integrated circuits (ICs). As mentioned above, handshaking signals are communicated between the front-end receiver 101 and base-band processor 104. In this example, a real-time loop is implemented via handshaking lines 112 for communicating status information from front-end receiver 101 to base-band processor 104, and via the Inter-Integrated Circuit ($I^2C$) interface, Serial Peripheral Interface (SPI), or Two Wire (TW) interface 113 for communicating information from host CPU 110 to front-end receiver 101. Information such as channel is tuned (phase-locked loop (PLL) is locked) is communicated from front-end receiver 101 to base-band processor 104 via lines 112, and information such as an increase/decrease in gain due to IF converter operations is communicated from host CPU 110 to front-end receiver 101 via the $I^2C$ interface 113.

The real time loop is needed in this architecture for making inaudible channel changes or channel checks (also called AF update), as examples. Thus, in this conventional architecture 100 the payload (e.g., the analog IF signals for the received RF signals) is communicated from front-end receiver 101 to base-band processor 104 via a first interface 111, and separate interface(s), such as interfaces 112 and 113, are employed for exchanging status information between the front-end receiver 101 and base-band processor 104/host CPU 110. For instance, the status information communicated via the real time loop is communicated separate from the payload.

Again, in this conventional architecture 100, dedicated processor 104 performs the AM/FM demodulation controlled by host CPU 110. Thus, dedicated processor 104 is implemented for processing the payload signal received from front-end receiver 101, while a separate host CPU 110 is implemented for to control base-band processor 104 and front-end receiver 101. Furthermore the CPU can initiate an action, e.g., channel change, via interface 113. The action itself is executed between tuner 103 and base-band processor 104 by use of status information communicated between the front-end receiver 101 and the base-band processor 104 via interface 112.

More recently, software-defined radio systems have been proposed. In general, a software-defined radio system, or SDR, is a radio communication system where components that have conventionally been implemented in hardware (e.g., mixers, filters, amplifiers, modulators/demodulators, detectors, etc.) are instead implemented by means of software on a personal computer or embedded computing devices. A basic SDR system may include, for example, a personal computer equipped with a sound card, or other analog-to-digital converter (ADC), preceded by some form of RF front-end, such as the front-end receiver 101 of FIG. 1. Significant amounts of signal processing may be handed over to the general-purpose processor, rather than being done in special-purpose hardware, such as the dedicated digital signal processor (DSP) 104 of FIG. 1. SDR architectures may enable a radio which can receive and transmit widely different radio protocols (sometimes referred to as a waveforms) based solely on the software used.

BRIEF SUMMARY OF THE INVENTION

A radio system architecture, such as may be employed for implementing a SDR system, may employ an autonomous front-end receiver with a base-band processor implemented for digital signal processing (e.g., a DSP). Rather than employing a dedicated processor for payload processing and a host CPU, such as in the conventional architecture 100 of FIG. 1, in certain embodiments, a processor (e.g., DSP) may be implemented for both executing software (for enabling the SDR) and for performing control management, such as for managing operations based on status information received from the front-end receiver.

The front-end receiver may receive (e.g., via an antenna) RF signals. The front-end receiver may include a tuner for tuning to a desired channel/frequency. The front-end receiver may convert the received RF signal to a digital stream (e.g., via an ADC), and communicate the payload as part of a digital data stream to the DSP base-band processor. As opposed to the dedicated processor 104 (for payload processing) operating under control of a host CPU 110 (for control management), as in the above-described example of FIG. 1, in certain embodiments a single CPU (or processor) may be implemented for both payload processing and control management.

DSPs typically perform block-oriented processing. As a result, a DSP base-band processor generally does not have the processing power to implement the real-time control loop of a conventional, non-software defined radio, where functionality is controlled such as is described in the above-described conventional radio architecture 100 of FIG. 1. Certain radio architectures, such as those provided by NXP or ST Microelectronics, employ a real time loop similar to that described with FIG. 1 for supplying status information between the front-end receiver and the base-band processor, but those architectures do not implement a true SDR system.

The present invention is directed generally to systems and methods employing a serial data interface for a digital radio system, such as for a SDR system. For instance, a serial data interface is provided between the front-end receiver and baseband processor (e.g., DSP) of a SDR system.

In certain embodiments, the front-end receiver not only outputs payload (e.g., samples, or digitized information of a radio channel), but also communicates various other non-payload information (which may be referred to generally herein as "meta data") via the serial interface. For instance, both payload and meta data may be streamed (as a digital data stream) from the front-end receiver to the base-band processor over the serial data interface. The meta data may include status information and/or other information which may be indicative of whether certain payload information contained in the stream is valid and/or usable (or whether it is noise, such as may arise during periods of tuning from one channel to another).

According to one embodiment, a radio system comprises a front-end receiver for receiving a RF signal and converting the RF signal into a digital payload signal. The system further comprises a base-band processor for processing the digital payload signal, and a serial data interface over which the front-end communicates the digital payload signal and meta data to the base-band processor.

The meta data may comprise information indicating whether a corresponding digital payload signal communicated over the serial data interface is valid. In certain embodiments, the meta data may comprise one or more of: information indicating whether the phase-locked loop (PLL) was locked during sampling by the front-end receiver, information indicating whether analog-to-digital conversion performed by the front-end receiver is error free, information indicating front-end receiver gain, information indicating front-end receiver temperature, and information indicating a state of tuning by the front-end receiver.

The front-end receiver may be configured to generate a digital data stream containing the digital payload signal and the meta data, and communicate the digital data stream over the serial data interface to the base-band processor.

In certain embodiments, the front-end receiver is configured to communicate frames over the serial data interface, where the frames each comprise the digital payload signal and meta data. In certain embodiments, each of the frames comprises a first number of bits for the digital payload signal (e.g., 16 bits of a 32-bit frame) and a second number of bits for the meta data (e.g., another 16 bits of the 32-bit frame).

In certain embodiments, front-end receiver is configured to generate certain meta data for corresponding digital payload data and multiplex the certain meta data over a plurality of frames. For instance, relatively slow-changing meta data information may be communicated over a plurality of frames, rather than being fully communicated in each frame. Examples of such relatively slow-changing meta data information that may be communicated over a plurality of frames in certain embodiments include: gain information and/or temperature index of the front-end receiver. These changes may occur at a rate of, say, approximately 1-bit per one tenth of a second, which may allow for the information to be communicated over the course of several frames.

In certain embodiments, the front-end receiver is further configured to generate certain other meta data for corresponding digital payload data and communicate such certain other meta data in each of the plurality of frames. That is, certain meta data information may be fully communicated in each frame. For instance, relatively rapid-changing meta data information may be fully communicated in each frame to reflect the validity of the payload data contained in the frame. Examples of such relatively rapid-changing meta data information that may be communicated fully in each frame in certain embodiments include: information regarding the PLL lock and/or ADC. This information may be updated every time that the front-end receiver performs ADC, as the information really changes with the sample.

In certain embodiments, the base-band processor is configured to manage processing of the received digital payload signal based at least in part on the meta data contained in the digital data stream.

In another embodiment of the present invention, a method comprises receiving, at a front-end receiver, a radio frequency (RF) signal. The method further comprises generating, at the front-end receiver, a digital data stream comprising payload data and meta data; and communicating, via a serial data interface, the digital data stream from the front-end receiver to a base-band processor. In certain embodiments, the base-band processor manages its processing of the payload data based at least in part on the meta data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present teachings, reference is now made to the following description taken in conjunction with the accompanying drawings.

DETAILED DESCRIPTION OF THE INVENTION

The word "exemplary" is used herein to mean "serving as an example, instance, or illustration." Any embodiment described herein as "exemplary" is not necessarily to be construed as preferred or advantageous over other embodiments.

Figure 2:
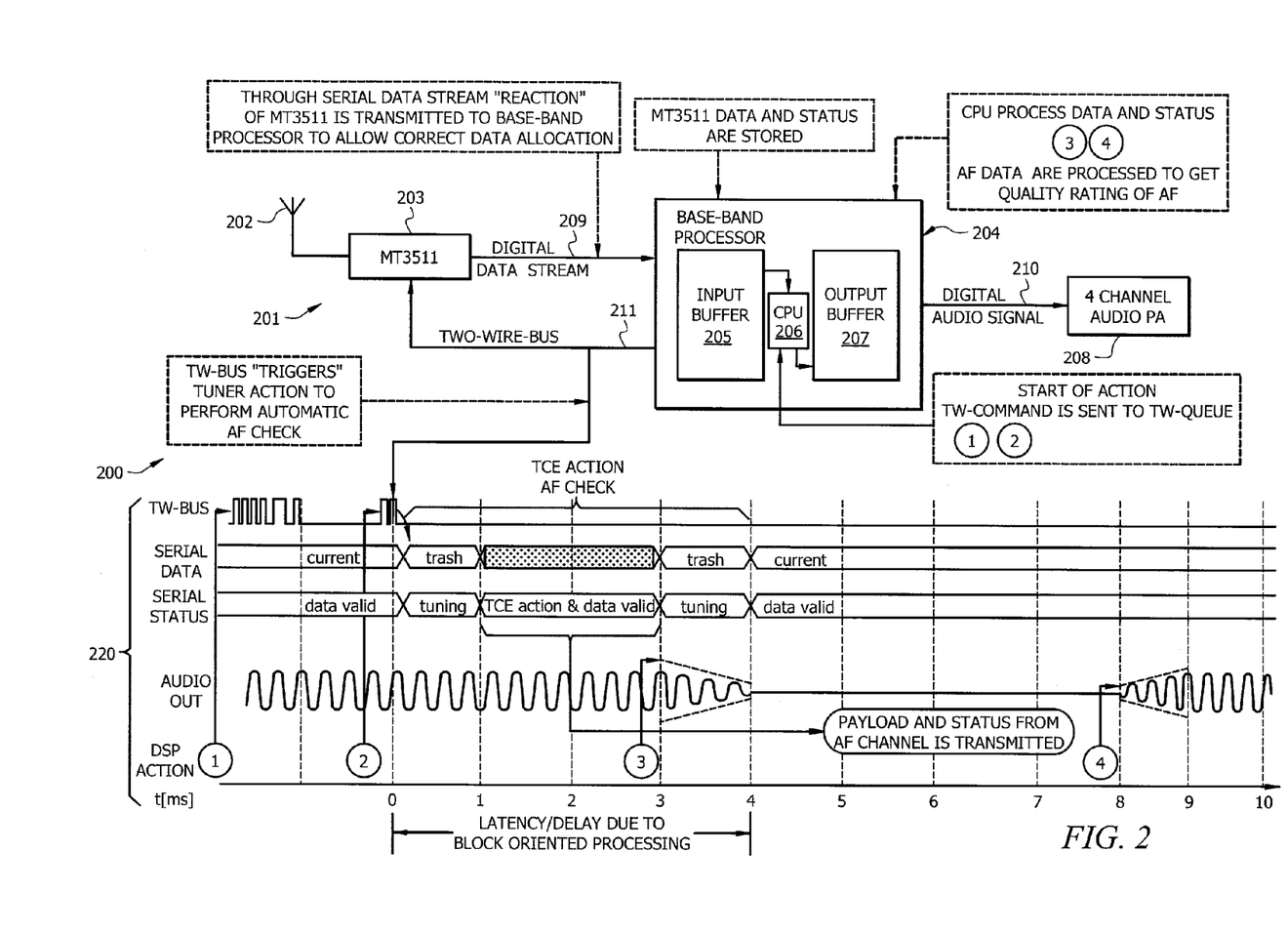
FIG. 2 is a block diagram of a radio architecture according to one embodiment of the present invention.

An example of a radio architecture according to one embodiment of the present invention is shown in FIG. 2. Architecture 200 of FIG. 2 includes a front-end receiver 201 that has an antenna 202 and a tuner (e.g., AM/FM tuner) 203. Architecture 200 further includes a base-band processor 204 that has an input buffer 205, CPU 206, and output buffer 207. In this example, architecture 200 further includes audio power amplifier(s) (e.g., 4 channel audio PA) 208. Of course, other radio system components, such as speakers, etc. may also be included, but are not shown in this example so as not to detract from the features of focus in FIG. 2.

In one embodiment, tuner 203 is a MT3511 RF MicroDigitizer™ IC available from Microtune, Inc. (hereafter referred to as "the MT3511"). Front-end receiver 201 may include, as tuner 203, a tuner as described in co-pending U.S. patent application Ser. No. 12/263,906 (now published as U.S. Patent Application Publication No. 2009/0058706) titled "Digital Radio System and Method of Operation" (hereafter "the '906 application"), the disclosure of which is hereby incorporated herein by reference. Of course, embodiments of the present invention are not restricted to implementation of a MT3511 tuner or the exemplary tuner described in the '906 application, but may instead employ other suitable tuner(s) in the front-end 201 for producing a digital data stream 209 as described further herein.

Base-band processor 204 may be implemented as a digital signal processor (DSP). For instance, in one embodiment base-band processor 204 is implemented as an ADSP-BF539 Blackfin Processor available from Analog Devices, Inc. Of course, embodiments of the present invention are not restricted to implementation of an ADSP-BF539 processor, but may instead employ other suitable processor(s) for implementing the base-band processor 204 in the manner as described further herein.

Exemplary architecture 200 enables a true SDR system. For instance, the front-end 201 receives an analog RF signal, and converts the signal from analog to digital format for processing in software by a DSP or multimedia processor, such as the CPU 206 of base-band processor 204. As one example, the MT3511, which may be implemented as tuner 203, is a specialized, automotive-grade RF-to-digital converter optimized to work with generic, high performance DSPs and multimedia processors to enable an SDR solution. The MT3511 combines the functions of a state-of-the-art RF tuner and an advanced ADC in a single chip, and then converts the signal from analog to digital format for processing in software by a DSP or multimedia processor (e.g., CPU 206).

In operation, an RF signal is received by front-end 201, via antenna 202. Tuner 203 (e.g., the MT3511) converts the analog RF signal to digital format, and outputs a digital data stream to base-band processor 204. As discussed further herein, the digital payload data (i.e., the converted RF signal) is preferably communicated/streamed via a serial data interface 209 between the tuner 203 and base-band processor 204. In addition, as discussed further below, front-end receiver 201 also generates meta data that it includes in the digital data stream output over serial data interface 209.

The digital data stream generated by the front-end receiver may be received (from serial data interface 209) and buffered in input buffer 205 of base-band processor 204. Base-band processor 204 processes the digital data stream 209. For instance, the digital data stream 209 may be processed in software by CPU 206 (implementing a true SDR system). The output of CPU 206 may be buffered in output buffer 207, and the resulting digital audio signal 210 produced by base-band processor 204 may be communicated to the audio PA 208. In the exemplary system 200, the front-end 201 and base-band processor 204 may be implemented on separate chips (on separate silicon substrates), and may thus be separate integrated circuits (ICs).

In accordance with embodiments of the present invention, front-end receiver 201 includes both digital payload data and meta data in the digital data stream that it outputs over serial data interface 209. As used herein, "payload" data refers generally to the sampled signal/content received by the front-end receiver 201 (e.g., the information received from a RF channel to which the front-end receiver 201 is tuned), and "meta data" refers generally to non-payload data, which may include status information or other information relating to the validity or usability of payload data contained in the digital data stream, as examples. For instance, in certain embodiments, the meta data may include one or more of: information indicating whether phase-locked loop (PLL) was locked during sampling by the front-end receiver 201, information indicating whether analog-to-digital conversion performed by the front-end receiver 201 is error free, information indicating front-end receiver gain, information indicating front-end receiver temperature, and information indicating a state of tuning by the front-end receiver 201.

In this way, base-band processor 204 can manage control operations (e.g., for processing of received payload data) based at least in part on the meta data included in the digital data stream. Thus, a separate real-time control loop, such as that implemented in the conventional architecture 100 of FIG. 1, need not be implemented. Instead, both payload data and meta data for managing control operations are included in the digital data stream communicated from the front-end receiver 201 to base-band processor 204 via the serial data interface 209.

In the exemplary architecture 200 of FIG. 2, an interface 211, which in this example is a two-wire bus, is implemented for communication from base-band processor 204 to front-end receiver 201. While a two-wire bus (or "TW-bus") is implemented in this example, some other type of communication interface may be implemented in other architectures in accordance with embodiments of the present invention. Commands may be communicated from base-band processor 204 to front-end receiver 201 via the interface 211, such as a command to tune to a particular RF channel/frequency.

Serial data interface 209 is an "enabler" for true SDR architectures because without the paired data (payload and meta data) being communicated together in the digital data stream from the front-end receiver 201 either real-time control loops, permanent polling of TW-bus registers, or permanent polling of hardware control pins of the front-end receiver 201 are generally necessary to gather status information to allow high efficiency processing in regards to processing power and processing scheduling for the base-band processor 204. By generating both payload data and meta data in the digital data stream communicated from front-end receiver 201 to base-band processor 204 over serial data interface 209, no such separate real-time loop for exchange of control information need be implemented between the front-end receiver 201 and base-band processor 204 (as in the conventional radio architecture 100 of FIG. 1).

Additionally, buffered input data (in input buffer 205) may be sorted by base-band processor 204 based on meta data (e.g., status) information. For example, an AF-check routine may be employed in the exemplary SDR system 200 of FIG. 2 for checking signal quality of an alternative frequency (AF) that is transmitting the same content as the current tuned channel. "AF" means alternative frequency, which refers to a channel/frequency carrying the same content as the current received channel but on a different frequency. AF is commonly employed in Europe. For example, in Europe, a station KDMX at 102.9 MHz may be received at 101.3 MHz with the same program. During such an AF-check routine, several data are "trash" because PLL was not locked during sampling. This condition can be detected with the corresponding (or "paired") status information contained in the digital data stream along with the payload data. Data related to the alternative channel/frequency—and not to the current received channel—can be sorted and stored in a separate buffer for further processing (e.g., for evaluating whether the alternative channel/frequency provides higher quality than the current channel/frequency).

An exemplary timing diagram 220 showing various wave forms that may be encountered in the exemplary architecture 200 is also shown in FIG. 2. Timing diagram 220 shows exemplary wave forms over time for communication over the TW-bus interface 211, serial payload data included in the digital data stream output by front-end receiver 201, serial meta data (e.g., status data) included in the digital data stream output by front-end receiver 201, and audio out output (e.g., as audio out signal 210) by base-band processor 204. In addition, exemplary DSP action points (performed by base-band processor 204) 1-4 are shown, which are described further below. While an exemplary timing diagram and action points are shown and described for illustrative purposes in FIG. 2, it will be recognized that embodiments of the present invention are not limited to any particular timing (that might be inferred from the exemplary timing diagram 220) nor are embodiments of the present invention limited to performance of the exemplary actions 1-4 shown and described. Rather, various other timing parameters and/or actions may be supported or performed in any given implementation in accordance with embodiments of the present invention.

The exemplary timing diagram 220 contains an example of an AF update being performed in accordance with one embodiment of the present invention. In the example illustrated by the timing diagram 220, base-band processor 204 first sends over TW-bus 211 a start of action command at action point 1, which may be, for example, an indication of a particular channel/frequency to which the tuner 203 is to tune. The corresponding payload data for the channel/frequency to which the tuner 203 is tuned is output in the digital data stream communicated over data serial interface 209. As shown in the Serial Data waveform, initially in this example the payload data is "current", i.e., the payload data corresponding to the current channel/frequency to which the tuner 203 is tuned is output in the digital data stream. Additionally, the meta data included in the digital data stream communicated over data serial interface 209 indicates that the payload data is valid. For instance, as shown in the Serial Status waveform, the meta data initially indicates that the payload data is valid.

At action point 2, the base-band processor 204 communicates over TW-bus 211 a command to trigger tuner 203 to perform an automatic AF-check routine. During such an AF-check routine, the front-end tuner 203 may tune to an alternative channel with the same content as the current received station and then tune back automatically. During the time tuned to the alternative channel, the audio may be muted and the signal quality of the alternative channel may be judged (indicated with AF data). It is noted that in some embodiments this judging may also be undertaken at a later point, e.g., after payload data of several AF's are collected in a buffer and processed later as part of an AF judgment thread. As shown in the Serial Data waveform (for times 0-4), during the performance of such AF-check routine, the serial payload data contained in the digital data stream output by front-end receiver 201 contains "trash" (or "noise") and/or payload data for the AF. The corresponding meta data communicated in the digital data stream output by front-end receiver 201, as shown in the Serial Status waveform, indicates that a portion of the payload data corresponds to payload data sampled during tuning (e.g., from the current channel/frequency to the AF) and is thus "trash." The meta data then indicates that the Tuning Control Engine (TCE) action is performed and the data is valid (e.g., the corresponding payload data is valid AF payload data). The meta data then indicates that a portion of the payload data corresponds to payload data sampled during tuning (e.g., from the AF back to the original or "current" channel/frequency) and is thus "trash."

The base-band processor 204 can manage/control its processing of the payload data based at least in part on the corresponding meta data. For instance, base-band processor 204 can mute the audio for the AF payload data, and evaluate the signal quality of the alternative frequency (i.e., the AF payload data indicated as valid data by the meta data). In the timing diagram 220 of FIG. 2, the muting action 3 of the audio is delayed/shifted because of the latency due to block-oriented processing. In action 4, base-band processor 204 restores the audio (un-mutes it) for outputting the audio contained in the digital payload data, as this now corresponds again to the "current" channel/frequency with meta data indicating it as valid.

Without sending payload data paired with meta data (e.g., status information) of the front-end receiver, the above-mentioned AF-check routine cannot be done inaudibly in a true SDR architecture (or other architecture that employs a DSP for the base-band processor without a separate real-time control loop between the base-band processor and front-end receiver). In other words, the listener would hear some noise or blanking.

Sending payload data and paired meta data in accordance with certain embodiments of the present invention replaces the real-time control loop of conventional radio architectures (as in FIG. 1) and enables operations, such as the exemplary AF-check routine described above, to be performed while allowing control of the payload processing for optimizing a listener's experience. That is, the meta data paired with the payload data communicated over the serial data interface 209 enables control of the payload processing to be managed, similar to the manner in which such control of payload processing has conventionally been managed through implementation of the real-time loop of FIG. 1. While an example of an AF-check routine is shown for illustrative purposes in the exemplary timing diagram 220 of FIG. 2, various other operations and/or meta data (e.g., status information) may be communicated in a similar manner in addition to or instead of AF-checking information in accordance with embodiments of the present invention. Embodiments of the present invention enable communication of payload data and corresponding meta data from front-end receiver 201 to base-band processor 204 via serial data interface 209, thereby alleviating the need for a separate real-time control loop interface to be implemented while ensuring that the base-band processor can effectively determine the validity of (and/or other relevant information pertaining to) the payload data it receives.

For SDR application, autonomous digital front-ends (tuners), such as front-end receiver 201 of FIG. 2, are essential to avoid real-time control loops (MIPS consuming) between base-band processor 204 and front-end receiver 201. Because the base-band processor 204 (e.g., a DSP) may be implemented to perform block oriented processing, the front-end receiver 201 is preferably designed to allow block oriented processing.

Block oriented processing generally means that buffered input data (in input buffer 205 received from the front-end receiver 201 are processed block-wise in the base-band processor 204. To enable enhancement of signal performance and/or correct sorting of data and/or judgment (valid data) of data, appropriate meta data (e.g., status information from the front-end receiver 201) is desired. Such meta data may be employed to communicate such information as one or more of: information indicating PLL locked during sampling, information indicating that the ADC conversion was error free, information indicating front-end receiver gain, information indicating front-end receiver temperature, and information indicating state of the tuning system in the front-end receiver, as examples. As discussed further herein, serial data interface 209 is disclosed herein for communicating payload data, as well as such meta data, via a digital data stream from the front-end receiver 201 to the base-band processor 204 in accordance with certain embodiments of the present invention. Such communication of both payload data and meta data in a digital data stream via serial data interface 209 alleviates the need for a separate real-time control loop communication/interface, such as that of conventional architecture 100 of FIG. 1.

Figure 3:
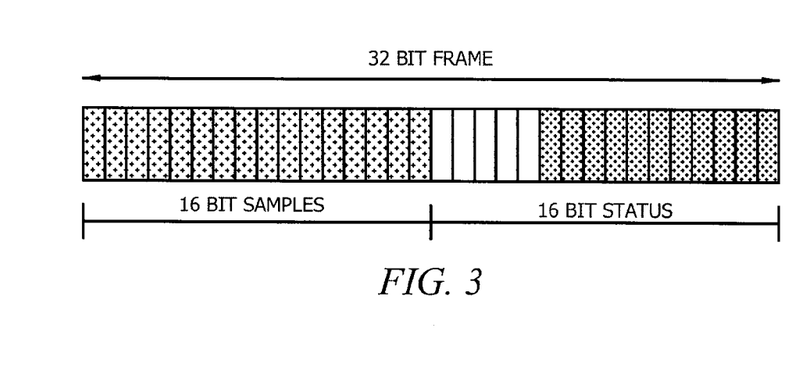
FIG. 3 is a diagram showing an example of a frame that may be communicated via a serial data interface from a front-end receiver to a base-band processor in accordance with one embodiment of the present invention.

Turning to FIG. 3, an example of arrangement of payload data and meta data in a frame communicated/streamed over the serial data interface 209 from the front-end 201 to the base-band processor 204 in accordance with one embodiment is shown. In this example, each frame communicated in the digital data stream over serial data interface 209 is a 32-bit frame. Further, in this example, the first 16 bits of the 32-bit frame carry payload data, while the last 16 bits of the 32-bit frame carry meta data. Of course, in other implementations different frame sizes may be employed and/or a different number of bits (as well as arrangement thereof in the frame) may be employed for communicating the payload data and meta data.

One consideration for selecting frame bit size might be the memory size or memory type of the input buffer 205 of base-band processor 204. For instance, in one exemplary embodiment, the input buffer 205 is 32-bit oriented, and so a frame size of 32 bits matches well with such input buffer 205. If the base-band processor's input buffer 205 is only 16-bits wide, then it may be desirable to employ a 16-bit frame size.

Additionally, the allocation of bits in the frame to payload and meta data need not be half and half in any given implementation. In general, the minimum number of bits that would be desirable for carrying payload in each frame (for AM/FM applications) is typically about 8 bits, whereas a minimum of at least one bit is generally desirable in each frame for meta data (e.g., for at least indicating whether PLL was locked). In certain implementations, a relatively few number of meta data bits (e.g., one) may be employed and various types of meta data information may be logically ANDed together in the front-end receiver, wherein the meta data bit(s) may thus efficiently indicate whether any of various types of status information potentially render the corresponding payload data in the frame invalid or unusable by the base-band processor.

Thus, according to one embodiment, a serial data interface 209 is implemented to provide payload data and meta data (e.g., status information) arranged as 16 bits of payload data and 16 bits of meta data in each 32-bit frame, as shown in FIG. 3. Of course, other combinations/arrangements may be employed in accordance with the concepts described herein.

Figure 4A:
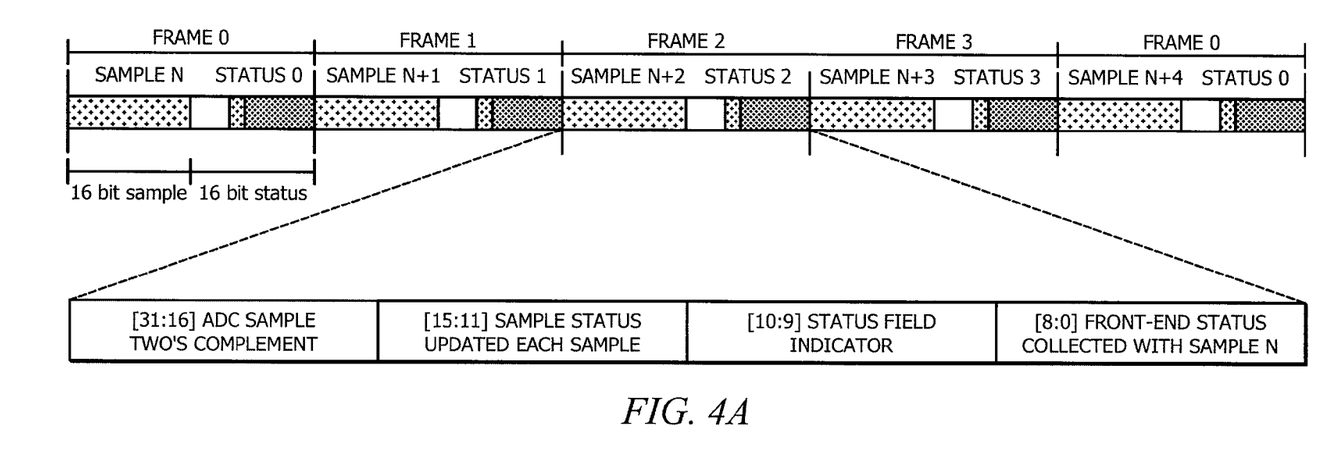
FIGS. 4A-4E are diagrams showing an example of a series of frames in more detail that may be communicated via a serial data interface from a front-end receiver to a base-band processor in accordance with one exemplary embodiment of the present invention.
Figure 4B:
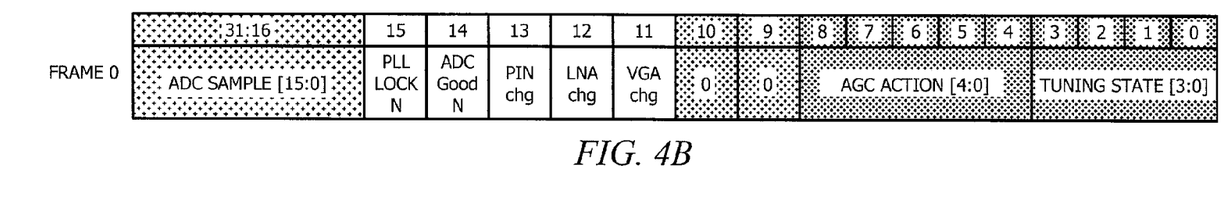
Figure 4C:
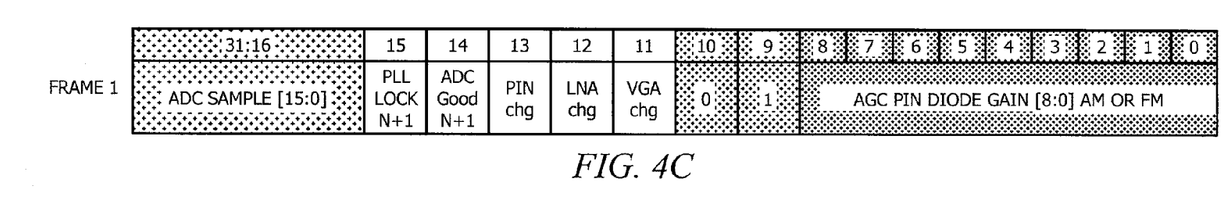
Figure 4D:
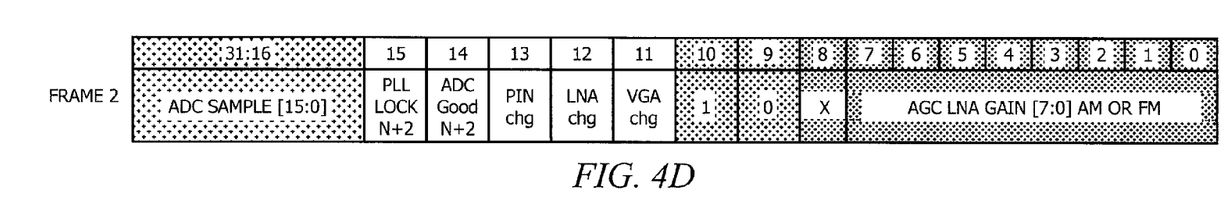
Figure 4E:
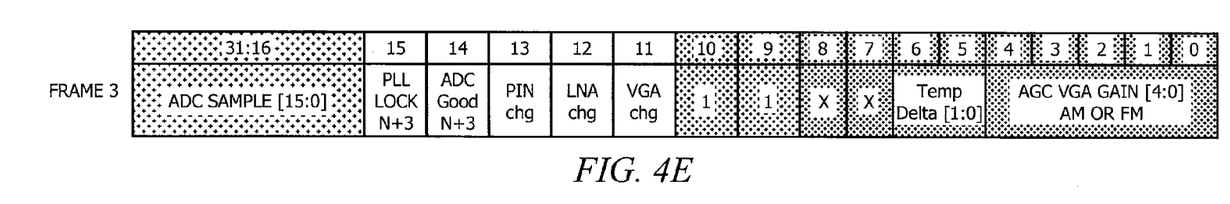

FIGS. 4A-4E show a further example of frames for communicating payload data and meta data over the serial data interface 209 from the front-end receiver 201 to the base-band processor 204 in accordance with one embodiment. In the example of FIG. 4A, a series of frames that may be communicated from front-end receiver 201 to base-band processor 204 are shown. As in the example of FIG. 3, in this example each of the frames is 32 bits, with 16 bits for payload data and 16 bits for meta data. Frame 0 contains payload data for a first sample, sample N, and a first meta data, "status 0." The next frame, frame 1, contains payload data for a next sample, sample N+1, and a second meta data, "status 1." The next frame, frame 2, contains payload data for a next sample, sample N+2, and a third meta data, "status 2." The next frame, frame 3, contains payload data for a next sample, sample N+3, and a fourth meta data, "status 3."

An exemplary arrangement of data in the frames, according to one embodiment, is illustrated for the exploded view of frame 2 in FIG. 4A. In this example, half of the bits of each frame (bits 15:0) are used for carrying meta data, while the other half of the bits of each frame (bits 31:16) are used for carrying payload data. As shown in the exploded view of frame 2 in FIG. 4A, bits 8:0 contain front-end receiver status information collected with sample N. Bits 10:9 provide a status field indicator, and bits 15:11 provide an indication of sample status that is updated for each sample carried in a corresponding frame (in bits 31:16). Bits 31:16 are used for carrying the ADC sample.

A more detailed example of the arrangement of bits in frames 0-3 in accordance with one embodiment is shown in FIGS. 4B-4E, respectively.

Some status information may be gathered by the front-end receiver 201 at the same time as the sampling (conversion of the received analog RF signal to digital data) to generate time-synchronized information of the front-end receiver 201. Such information needed for time-synchronous compensation of, for example, phase changes (phase step of attenuator) for digital standards using digital modulation like QAM, may be indicated in the meta data. Such rapidly-changing information may be communicated fully in each frame for the payload data contained in such frame.

In certain embodiments, meta data (e.g., status information) with moderate variation (compared to sample frequency or payload data frequency) can be multiplexed over several frames to transmit all status information toward the base-band processor 204, as shown in FIG. 4. By multiplexing certain meta data for communication over a plurality of frames, rather than fully communicating the information in each frame, a greater amount of frame bandwidth may be available in each frame for carrying payload data.

As one example, an A/D converter is preferably implemented in the front-end receiver, and, say, once every two megahertz it gets a sample. And, every sample clock gets a real-time status update of certain information, such as information indicating whether PLL was locked. However, all meta data information (e.g., status information) may not need to be updated each 2 megahertz, for example. For instance, some types of meta data information may be updated in the 500 kilohertz range or so, and then multiplexed over several data frames. For instance, certain "multiplexed" types of meta data information may be communicated in selected one or more of a sequence plurality frames (e.g., once every 4 frames), rather than being fully communicated in each frame.

Because some of the meta data is changing rapidly and some of it is changing more slowly, the more slowly-changing meta data information may be multiplexed with multiple frames of the payload data for effectively communicating this information to the base-band processor without overloading the system or consuming unnecessary bandwidth for meta data in each frame.

FIGS. 4B-4E illustrate indications of PLL lock, ADC, PIN, LNA, and VGA for each corresponding sample that is included in the payload portion of the frame. Bits 10:9 of the status field indicator count upward from 00 to 01, then to 10, then to 11, and then repeat back at 00 in order act as an address to identify/allocate the following 8 bits in the status frame. For instance, frame 0 includes tuning state and AGC action, frame 1 includes AGC pin diode gain, frame 2 includes AGC LNA gain, and frame 3 includes temperature delta and AGC VGA gain. The PIN LNA VGA (bit 13:11) indicate whether a gain changes has happened between sample N and sample N−1. As such, bits 13:11 may act as a kind of time-stamp to indicate that a gain change happen between sample N and sample N−1. The gain change can happen in the front-end blocks; e.g., Low Noise Amplifier (LNA).

Figure 5:
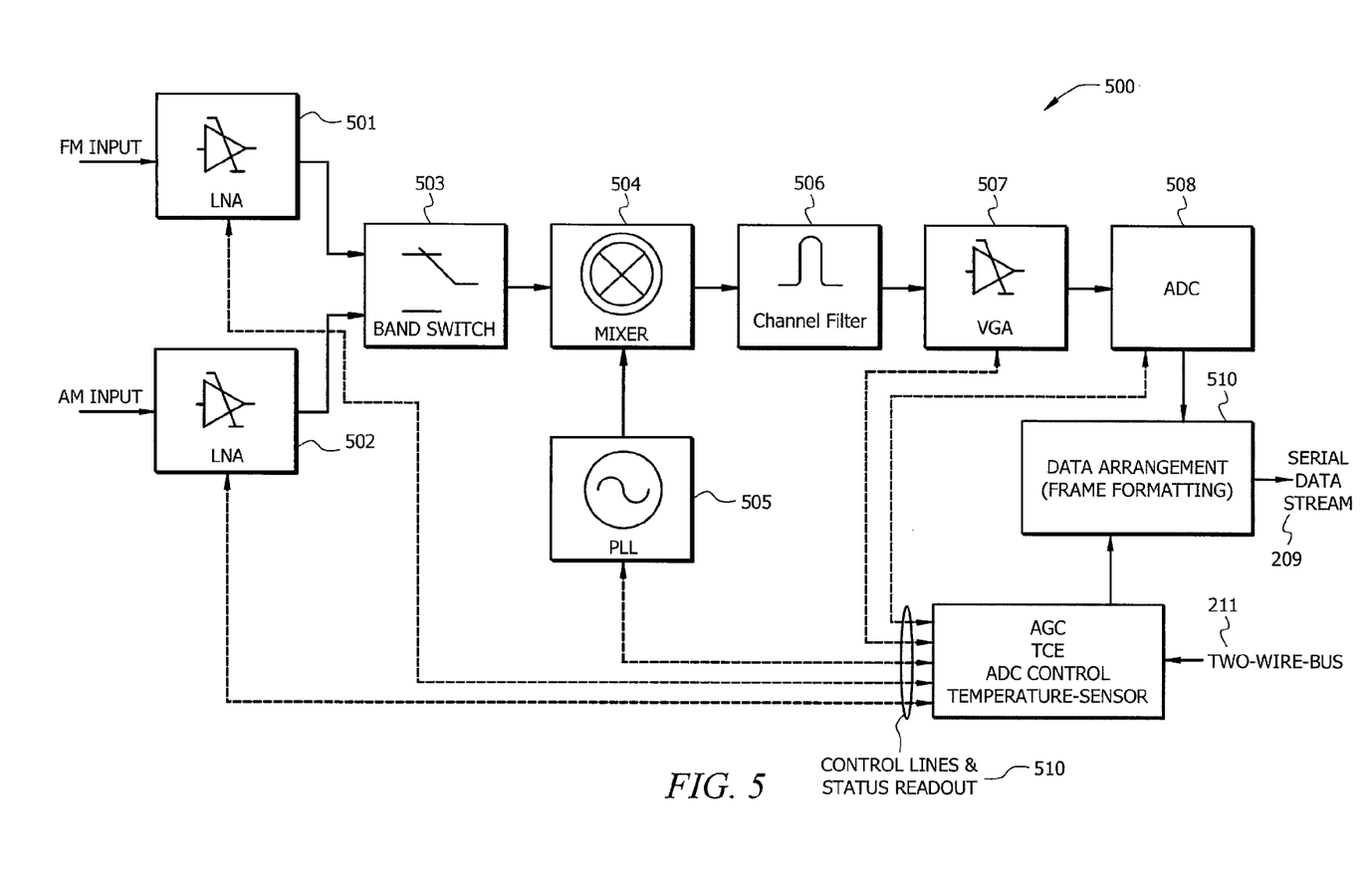
FIG. 5 is an exemplary block diagram for implementing tuner 203 of FIG. 2 in accordance with one embodiment of the present invention.

FIG. 5 shows an exemplary block diagram for implementing tuner 203 of FIG. 2 in accordance with one embodiment of the present invention. The exemplary architecture 500 for the tuner includes low-noise amplifiers (LNAs) 501 and 502, band switch 503, mixer 504, voltage-controlled oscillator (VCO) 505, filter 506, variable amplifier 507, and ADC 508.

The RF input signals are first amplified with LNAs 501 for FM or 502 for AM. With the band switch 503 the input signal is selected. The image rejection mixer 504 driven by a PLL 505 performs the down-conversion or up-conversion of the antenna signal to an intermediate frequency. The IF is filtered by band-pass filter 506 to provide steep selectivity and narrow bandwidth. Before quantization, the filtered IF signal is amplified with the VGA 507. The ADC 508 digitizes the filtered and gained IF signal.

Several blocks of the signal chain are digitally controlled 509 by control lines 510, e.g., the AGC (automatic gain control) controls the amplifier 501 502 507, the PLL 505 is controlled by the tuning control engine TCE, the ADC is controlled by the ADC control. The current applied control signal of each block are gathered with the samples and arranged (as shown in FIG. 3 and FIG. 4) in the block 209, together with the samples, form the ADC into the serial data stream 209.

In certain embodiments, payload data is generated in digital form by the ADC 508, and meta data information is coming from several blocks inside the front-end receiver 201. That is, the RF information received for a channel/frequency to which the front-end receiver's tuner is tuned is digitized by ADC 508, and at the same time front-end receiver 201 is collecting some meta data, such as status information like whether the phase lock loop (PLL) is actually locked, the setting of the automatic gain control, and/or the setting of the tuning control engine, as examples. In certain embodiments, a tuning control engine may be implemented in the front-end receiver 201 and may be configured to automatically go, for example, to channel A and wait one or two milliseconds, then go to channel B, wait 1 or 2 milliseconds, then go to channels C, D and E (waiting for one or two milliseconds at each), and then return back to Channel A. So, if the base-band processor communicates a command to front-end receiver 201 (via the 2-wire bus 211) to perform a scan on Channels A, B, C, D, and E, the tuning control engine may, in response to the command, automatically perform the above-mentioned scan in the front-end receiver. All the information as to which channel the payload data is received from is indicated by the corresponding meta data included in the digital data stream communicated via the serial data interface 209.

Figure 6:
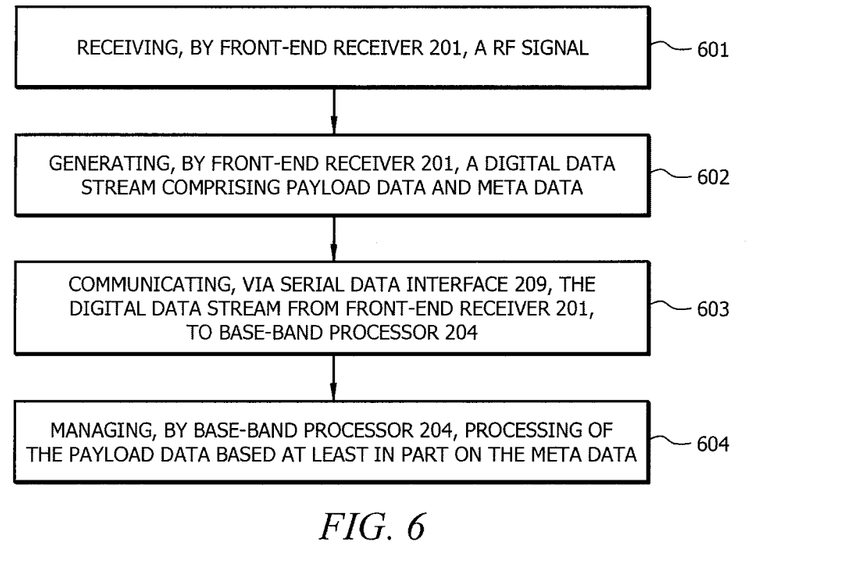
FIG. 6 shows an exemplary operational flow diagram for one embodiment of the present invention.

FIG. 6 shows an exemplary operational flow diagram for one embodiment of the present invention. In operational block 601, front-end receiver 201 receives a RF signal. In block 602, front-end receiver 201 generates a digital data stream comprising payload data and meta data. In block 603, front-end receiver 201 communicates, via serial data interface 209, the digital data stream to base-band processor 204.

As discussed above with FIGS. 3 and 4A-4E, the digital data stream may be communicated as frames over the serial data interface, where each frame contains digital payload data and meta data. For instance, each of the frames may have a first number of bits (e.g., bits 31:16 in the examples of FIGS. 4A-4E) for carrying digital payload data and a second number of bits (e.g., bits 15:0 in the examples of FIGS. 4A-4E) for carrying meta data.

As also discussed above with FIGS. 4A-4E, in certain embodiments a portion of the meta data may be multiplexed over a plurality of frames. For instance, certain meta data that changes relatively slowly (e.g., compared to the payload data), such as gain information and/or temperature index of the front-end receiver, may be partitioned for communication over a plurality of different frames, rather than being fully communicated in a single frame. Also, in certain embodiments, a portion of the meta data may be communicated fully in each frame. For instance, certain meta data that changes relatively rapidly, such as information regarding the PLL lock and/or analog-to-digital conversion (ADC), may be communicated fully in each frame to fully communicate certain information (e.g., status information) about the validity or usability of the payload data contained in the frame.

In certain embodiments, base-band processor 204 manages its processing of the payload data based at least in part on the meta data, such as shown in operational block 604. For instance, as discussed above with the exemplary timing diagram 220 of FIG. 2, base-band processor may mute the audio output and/or take other actions for managing/controlling its processing of payload data based at least in part on corresponding meta data received for the payload data.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A radio system comprising:
a front-end receiver for receiving a radio frequency (RF) signal and converting the RF signal into a digital payload signal, wherein said front-end receiver is configured to generate frames each containing data of said digital payload signal and meta data;
a base-band processor for processing the digital payload signal; and
a serial data interface over which said front-end communicates said frames each containing data of said digital payload signal and meta data in a single digital data stream to said base-band processor,
wherein said meta data comprises first meta data, and said front-end receiver is configured to generate the first meta data for corresponding digital payload data and to multiplex the first meta data over a plurality of frames.

2. The radio system of claim 1 wherein said base-band processor comprises a digital signal processor.

3. The radio system of claim 1 wherein each of said frames comprises a first number of bits for said digital payload signal and a second number of bits for said meta data, wherein said first number and said second number is each at least one.

4. The radio system of claim 3 wherein each of said frames is 32 bits, and wherein said first number of bits is 16 and wherein said second number of bits is 16.

5. The radio system of claim 1 wherein said first data comprises at least one of gain information and a temperature index of the front-end receiver.

6. The radio system of claim 1 wherein said front-end receiver is further configured to generate second meta data for corresponding digital payload data and communicate said second meta data in each of said plurality of frames.

7. The radio system of claim 6 wherein said second meta data comprises at least one of information indicating whether a phase-locked loop (PLL) was locked and information indicating whether an error occurred in analog-to-digital conversion (ADC).

8. The radio system of claim 1 wherein said base-band processor is configured to manage processing of said digital payload signal based at least in part on said meta data.

9. The radio system of claim 1 wherein said meta data comprises information indicating whether a corresponding digital payload signal communicated over said serial data interface is valid.

10. The radio system of claim 1 wherein said meta data comprises at least one of:
information indicating whether phase-locked loop (PLL) was locked during sampling by the front-end receiver, information indicating whether analog-to-digital conversion performed by the front-end receiver is error free, information indicating front-end receiver gain, information indicating front-end receiver temperature, and information indicating a state of tuning by the front-end receiver.

11. A method comprising:
receiving, at a front-end receiver, a radio frequency (RF) signal
converting, at said front-end receiver, the RF signal into payload data;
generating, at said front-end receiver, a single digital data stream comprising frames each containing payload data and meta data; and
communicating, via a serial data interface, said digital data stream from said front-end receiver to a base-band processor,
wherein said generating comprises multiplexing a first portion of said meta data over a plurality of said frames.

12. The method of claim 11 wherein each of said frames comprises a first number of bits for said digital payload signal and a second number of bits for said meta data, wherein said first number and said second number is each at least one.

13. The method of claim 11 wherein said first portion of said meta data comprises at least one of gain information and a temperature index of the front-end receiver.

14. The method of claim 11 wherein said generating comprises:
generating a second portion of said meta data fully in each of said plurality of frames.

15. The method of claim 14 wherein said second portion of said meta data comprises at least one of information indicating whether phase-locked loop (PLL) was locked and information indicating whether an error occurred in analog-to-digital conversion (ADC).

16. The method of claim 11 further comprising:
managing, by said base-band processor, processing of said payload data based at least in part on said meta data.

17. The method of claim 11 wherein said meta data comprises information indicating whether corresponding payload data in the digital data stream is valid.

18. The method of claim 11 wherein said meta data comprises at least one of:
information indicating whether phase-locked loop (PLL) was locked during sampling by the front-end receiver, information indicating whether analog-to-digital conversion performed by the front-end receiver is error free, information indicating front-end receiver gain, information indicating front-end receiver temperature, and information indicating a state of tuning by the front-end receiver.

19. A radio system comprising:
a front-end receiver, wherein said front-end receiver is configured to:
receive a radio frequency (RF) signal:
convert the RF signal into payload data;
generate a single digital data stream comprising frames each containing payload data and meta data;
and output said digital data stream via a serial data interface,
wherein the front-end receiver generates the single digital data stream by multiplexing a portion of said meta data over a plurality of said frames.

20. The radio system of claim 19 wherein said front-end receiver comprises:
means for receiving said RF signal;
means for generating said single digital data stream comprising said payload data and said meta data; and
means for outputting said digital data stream via said serial data interface.

21. The radio system of claim 19 wherein said serial data interface is communicatively coupled from said front-end receiver to a base-band processor.

22. The radio system of claim 19 wherein said meta data comprises information indicating whether corresponding payload data in the digital data stream is valid.

* * * * *